United States Patent
Kalil et al.

(10) Patent No.: US 11,210,290 B2
(45) Date of Patent: Dec. 28, 2021

(54) AUTOMATED OPTIMIZATION OF NUMBER-OF-FREQUENT-VALUE DATABASE STATISTICS

(71) Applicant: INTERNATIONAL BUSINESS MACHINES CORPORATION, Armonk, NY (US)

(72) Inventors: Mohamad F. Kalil, Ottawa (CA); Vincent Corvinelli, Mississauga (CA); Calisto Zuzarte, Pickering (CA); Petrus Chan, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/734,555

(22) Filed: Jan. 6, 2020

(65) Prior Publication Data

US 2021/0209110 A1    Jul. 8, 2021

(51) Int. Cl.
*G06F 7/00* (2006.01)
*G06F 16/2453* (2019.01)
*G06F 16/28* (2019.01)
*G06N 7/00* (2006.01)
*G06N 5/04* (2006.01)

(52) U.S. Cl.
CPC ...... *G06F 16/24545* (2019.01); *G06F 16/285* (2019.01); *G06N 5/04* (2013.01); *G06N 7/005* (2013.01)

(58) Field of Classification Search
CPC .......... G06F 16/24545; G06F 16/2462; G06F 16/285; G06F 16/9535; G06F 16/245391; G06N 5/04; G06N 7/005
See application file for complete search history.

(56) References Cited

U.S. PATENT DOCUMENTS 10,176,231 B2    1/2019   Finnerty
2003/0167275 A1*  9/2003   Rjaibi .................. G06F 16/2462
(Continued)

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Azam M Cheema
(74) *Attorney, Agent, or Firm* — Schmeiser, Olsen & Watts; Stephanie Carusillo

(57) ABSTRACT

A maintenance subsystem of a database-management system (DBMS) receives a database query that requests access to data stored in a database column. The subsystem retrieves or infers frequent-value statistics for that column, each of which specifies the number of times one distinct value is stored in the column. The statistics are partitioned into Keep and Discard clusters and, using statistical or other computational methods based on the column's data distribution, the subsystem determines an optimal number of the statistics that should be kept by the DBMS in order to minimize cost, errors, or other parameters desired by an implementer. The subsystem then directly or indirectly directs a query-optimizer component of the DBMS to consider the optimal number of frequent-value statistics when selecting an optimal data-access plan. The selected plan is then used by the DBMS's storage-manager component to access the column when servicing the received query.

20 Claims, 5 Drawing Sheets

(56) References Cited

U.S. PATENT DOCUMENTS

2008/0046455 A1    2/2008  Behm
2011/0264648 A1*  10/2011  Gulik .................. G06F 16/9535
                                                                707/722
2013/0033389 A1*   2/2013  Bendel .................... H03M 7/30
                                                                 341/50
2015/0254791 A1*   9/2015  Stockton ................ G06Q 50/18
                                                               705/7.28

OTHER PUBLICATIONS

Gurajada, A.P. et al.; Equidepth partitioning of a data set based on finding its medians; 1991 Symposium on Applied Computing; Apr. 3-5, 1991; pp. 92-101.

Ioannidis, Yannis E. et al.; Balancing histogram optimality and practicality for query result size estimation; In Proceedings of the 1995 ACM SIGMOD International Conference on Management of Data (SIGMOD '95); May 22-25, 1995; pp. 233-244.

Ioannidis, Yannis E. et al.; Optimal histograms for limiting worst-case error propagation in the size of join results ACM Transactions on Database Systems. 18(4); Dec. 1993; pp. 709-748.

* cited by examiner

AUTOMATED OPTIMIZATION OF NUMBER-OF-FREQUENT-VALUE DATABASE STATISTICS

BACKGROUND

The present invention relates in general to database-management systems (DBMSs) and in particular to query-optimization components of DBMSs.

A DBMS optimization component (or "optimizer") helps the DBMS provide real-time response when servicing data-access requests, such as Structured Query Language (SQL) queries. Optimization is required by a DBMS because queries generally describe only a desired result, and do not attempt to direct a DBMS how to produce that result. Because even the order in which two data elements are retrieved can greatly affect the time required to service a query, it is crucial that a DBMS select an optimized sequence of steps when servicing a query in order to provide the best performance or lowest resource-utilization. Optimizer modules provide this benefit by creating query-access plans that each instruct the DBMS how to most efficiently respond to a query.

Existing database optimizers generally select an optimal access plan by using statistics collected by the DBMS to estimate each candidate plan's execution cost. One of these statistics is the "frequent-value statistics" (FVS) parameter. Every database table column is characterized by a set of frequent-value statistics (FVS) that each specifies the number of times that a particular data value is stored in that column. For example, if a database column contains three instances of value "A," two of value "B," and two of value "C,", that column would be associated with three FVS values, each of which specifies the number of times value "A," "B," or "C" is stored in that column.

When selecting an optimal plan for accessing data in a column, an optimizer considers FVS parameters that characterize the data values most often stored in the column. These statistics allow the optimizer to estimate a distribution of data values in the column and to select an access method that is most appropriate for the distribution's degree of skewness. The number of FVS instances to be considered is usually determined by a single "number of frequent values" (NFV) configuration parameter that the DBMS applies to all columns or by direct selection when an administrator or other user performs a manual statistics-collection operation.

SUMMARY

Embodiments of the present invention comprise systems, methods, and computer program products for automated selection of number-of-frequent-value (NFV) statistics by a database-management system (DBMS). A subsystem of the DBMS receives a database query or other type of database-access request that requires access to data values stored in a database column. The subsystem retrieves or infers frequent-value statistics for that column, each of which specifies the number of times one distinct value is stored in the column. The statistics are ordered by frequency and then partitioned into two Keep and Discard clusters, such that the most frequently occurring data values are contained in the Keep cluster. Using statistical or other computational methods based on the column's data distribution, the subsystem then determines an optimal number of the statistics that should be kept by the DBMS in order to minimize cost, errors, or other parameters desired by an implementer. The subsystem then directly or indirectly directs a query-optimizer component of the DBMS to consider the optimal number of frequent-value statistics when selecting an optimal data-access plan. The selected plan is then used by the DBMS's storage-manager component to access the column when servicing the received access request.

DETAILED DESCRIPTION

Figure 1:
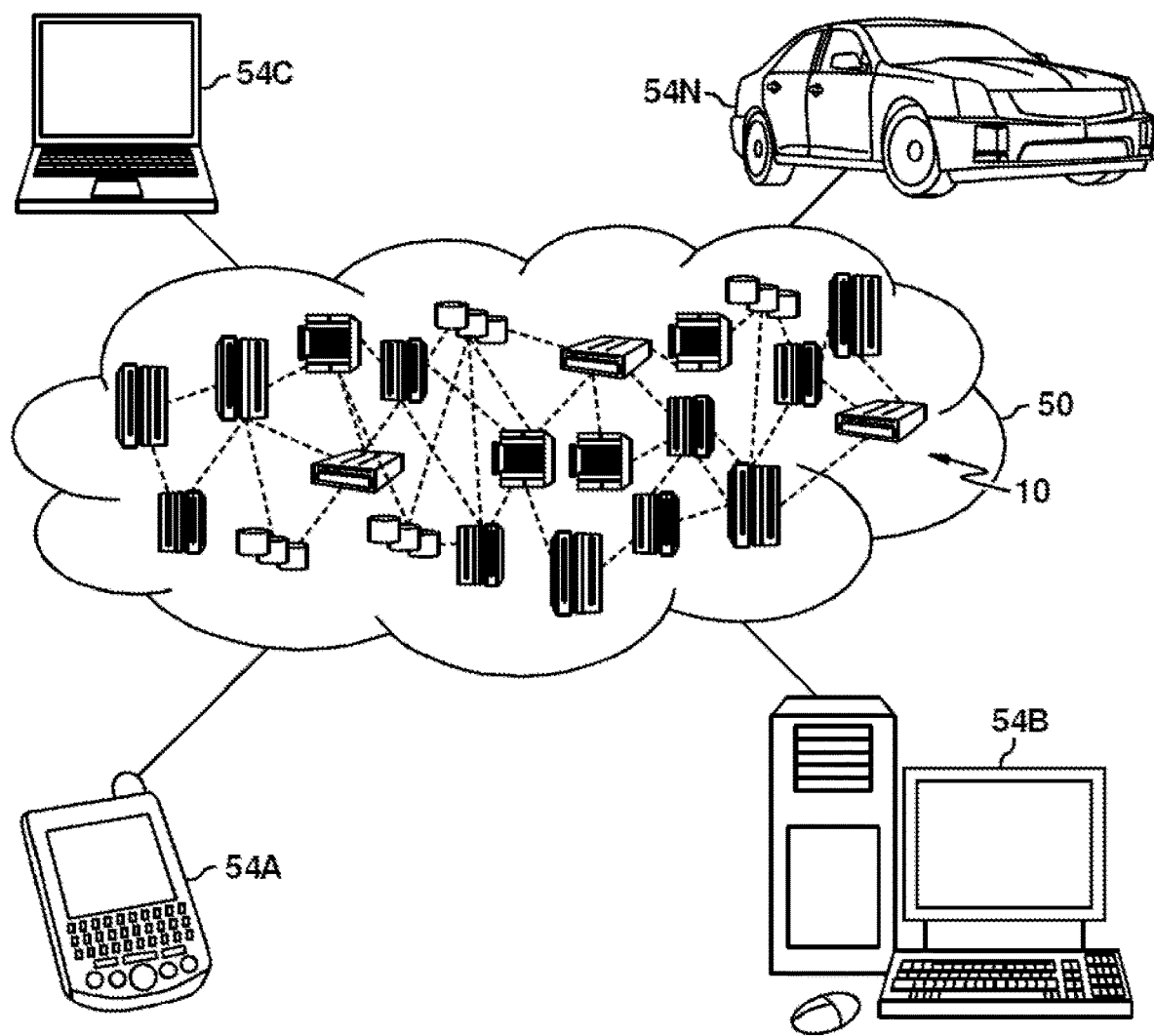
FIG. 1 depicts a cloud computing environment according to an embodiment of the present invention.

Existing DBMSs rely on a query-optimizer component to select an optimal data-access execution plan from the set of all possible plans capable of servicing a particular query. The optimizer attempts to select a lowest-cost plan by using DBMS-maintained statistics to estimate the cost to run each candidate plan. These statistics include a set of "frequent-value statistics" (FVSs) associated with each table column. Each FVS associated with a particular column identifies the number of times that one distinct data value is stored in that column.

For example, consider an SQL query

SELECT*FROM TABLE WHERE C1=10 AND C2>=50, which requests that a DBMS retrieve records that contain the value "10" from a database table's column C1.

If the frequent-value statistics for column C1 identify that the value "10" is stored in column C1 with relatively great frequency, accessing column C1 through a direct record-by-record scan may be less costly (that is, more efficient) way to retrieve qualifying records than using a predefined index to scan the entire column. On the other hand, if the values stored in column C1 are non-uniformly distributed, with no single value occurring with great frequency, using an index to search the entire table may be a more efficient way to find a relatively scarce qualifying record that contains the value "10." In this example, C1's frequent-value statistics can help the optimizer decide which access method is more likely to be optimal by identifying the relative number of times that the most frequently occurring values are stored in column C1.

Automated procedures for collecting and maintaining FVSs can impose significant overhead on a DBMS, since the DBMS may have to update at least one FVS every time the database undergoes significant updating. Existing DBMSs may be configured with a predetermined "number of frequent values" (NFV) parameter that limits the number of frequent-value statistics maintained for each column. When statistics collection is performed by means of manual operations, a NFV parameter may be selected by an administrator or other user performing the operations.

For example, if a DBMS is configured with an NFV setting of 10, that DBMS will maintain the ten most frequently occurring data values for each table column. That is, if a column is capable of storing 10,000 distinct numeric values, each FVS associated with that column would identify the number of times that one of the ten most frequently occurring values is stored in that column.

The choice of a NFV can significantly affect the performance of a DBMS. In general, a higher NFV value increases the precision with which an optimizer estimates filter factors of query predicates. This results in more accurate access-plan cost estimation and decreases the chance that the optimizer will select a very bad plan. However, a high NFV forces a DBMS to perform a greater number of operations when collecting statistics and requires more storage space for those statistics in the DBMS's catalog tables. A higher NFV can also increase the time needed to scan and process the FVSs of columns modified by a query or other access request.

In other words, a higher NFV increases DBMS overhead because collecting a greater number of FVSs for each table results in higher compile times, higher statistics-collection times, slower query compilation time, and increased DBMS-catalog storage. But collecting too few frequent values degrades the optimizer's ability to accurately estimate and compare the cost of alternate access plans, which can increase the likelihood that an optimizer will select a non-optimal plan.

Choosing an optimal NFV setting for a particular query requires knowledge of the distribution of data values for each column referenced by that query. Existing DBMSs, however, typically apply a single NFV value across the board when collecting FVSs for any column or table in the database. This system-wide NFV setting may be manually chosen by a database administrator or may be preconfigured by a DBMS vendor. This often-arbitrary choice cannot be optimized for every column, resulting in unnecessary overhead and the selection of non-optimal access plans.

Embodiments of the present invention address this deficiency of current database-management systems by providing a component of an improved type of DBMS that automatically selects a distinct NFV value for every table column. Embodiments use statistical or clustering methods, such as K-means clustering or minimum-entropy clustering to select an optimal NFV value for each column as a function of each column's current data distribution.

These embodiments may define two clusters of frequent-value statistics for each column. The first cluster contains data values stored most frequently in the column for which the DBMS should maintain frequent-value statistics, and the second cluster contains data values stored less-frequently in the column, which will not be stored or used by the DBMS. An NFV value for the column is derived as being equal to the minimum size of the first cluster that provides acceptable results for the distribution of data in that column.

Improved DBMSs that incorporate this mechanism provide significant benefits and advantages over existing database-management systems. The improved DBMS can collect statistics with less overhead because each table column is characterized by a minimum acceptable NFV tailored to the specific distribution of data of that column. Query processing is also more efficient because each column's optimized NFV value is selected to ensure that the optimizer has access to a number of frequent-value statistics sufficient to enable an accurate estimation of access-plan costs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
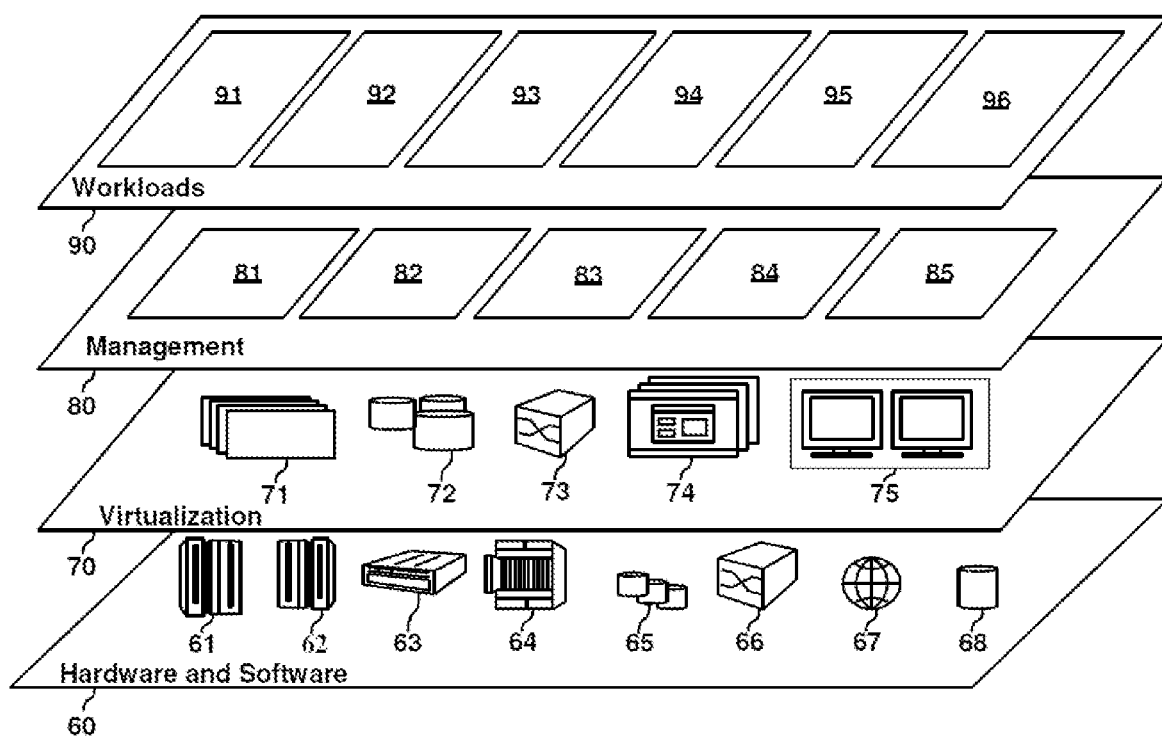
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of automated optimization of number-of-frequent-value statistics.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
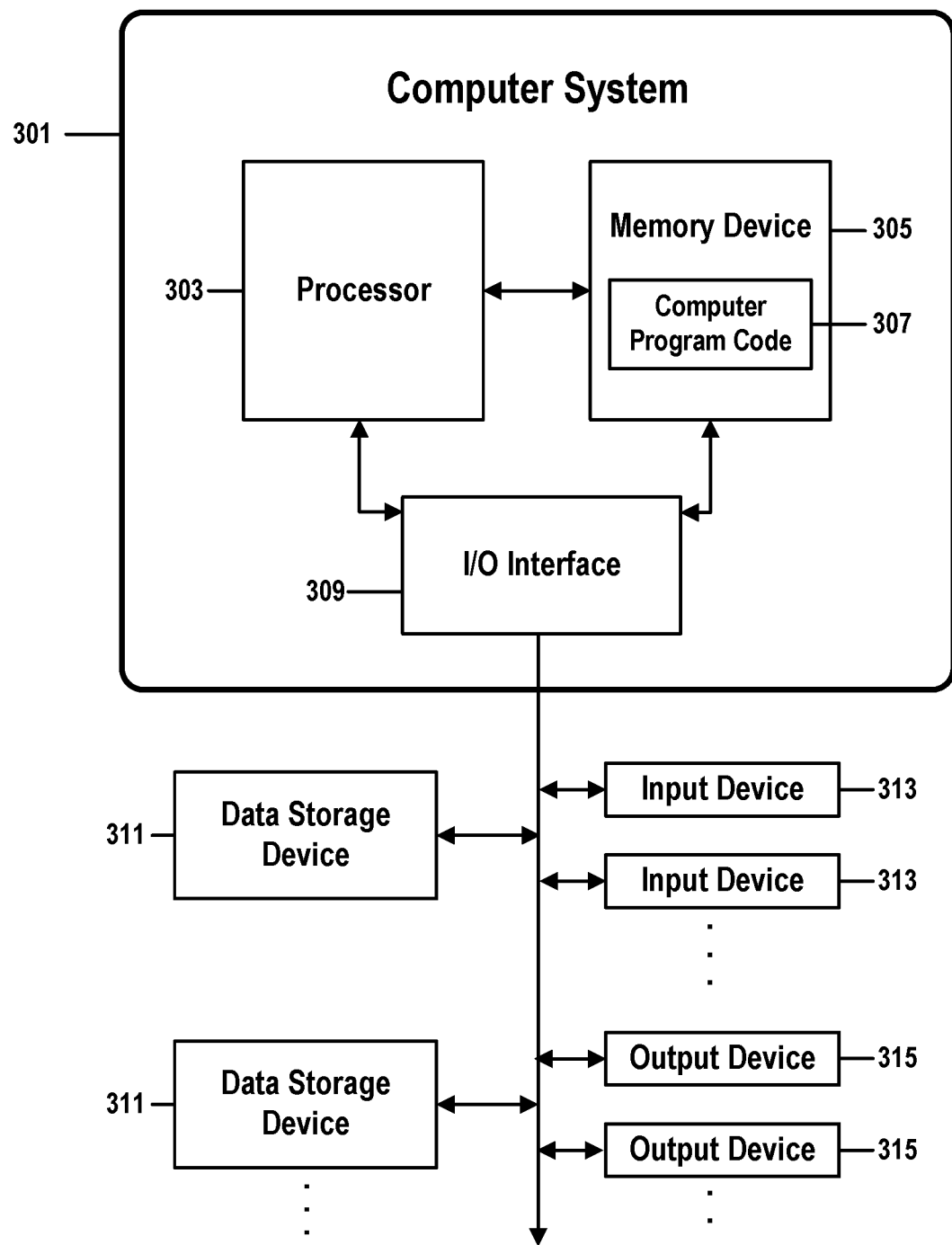
FIG. 3 shows the structure of a computer system and computer program code that may be used to implement a method for automated optimization of number-of-frequent-value statistics in accordance with embodiments of the present invention.

FIG. 3 shows a structure of a computer system and computer program code that may be used to implement a method for automated optimization of number-of-frequent-value statistics in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for automated optimization of number-of-frequent-value statistics in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for automated optimization of number-of-frequent-value statistics.

Any of the components of the present invention could be created, integrated, hosted, maintained, deployed, managed, serviced, supported, etc. by a service provider who offers to facilitate a method for automated optimization of number-of-frequent-value statistics. Thus the present invention discloses a process for deploying or integrating computing infrastructure, comprising integrating computer-readable code into the computer system 301, wherein the code in combination with the computer system 301 is capable of performing a method for automated optimization of number-of-frequent-value statistics.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for automated optimization of number-of-frequent-value statistics may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for automated optimization of number-of-frequent-value statistics is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
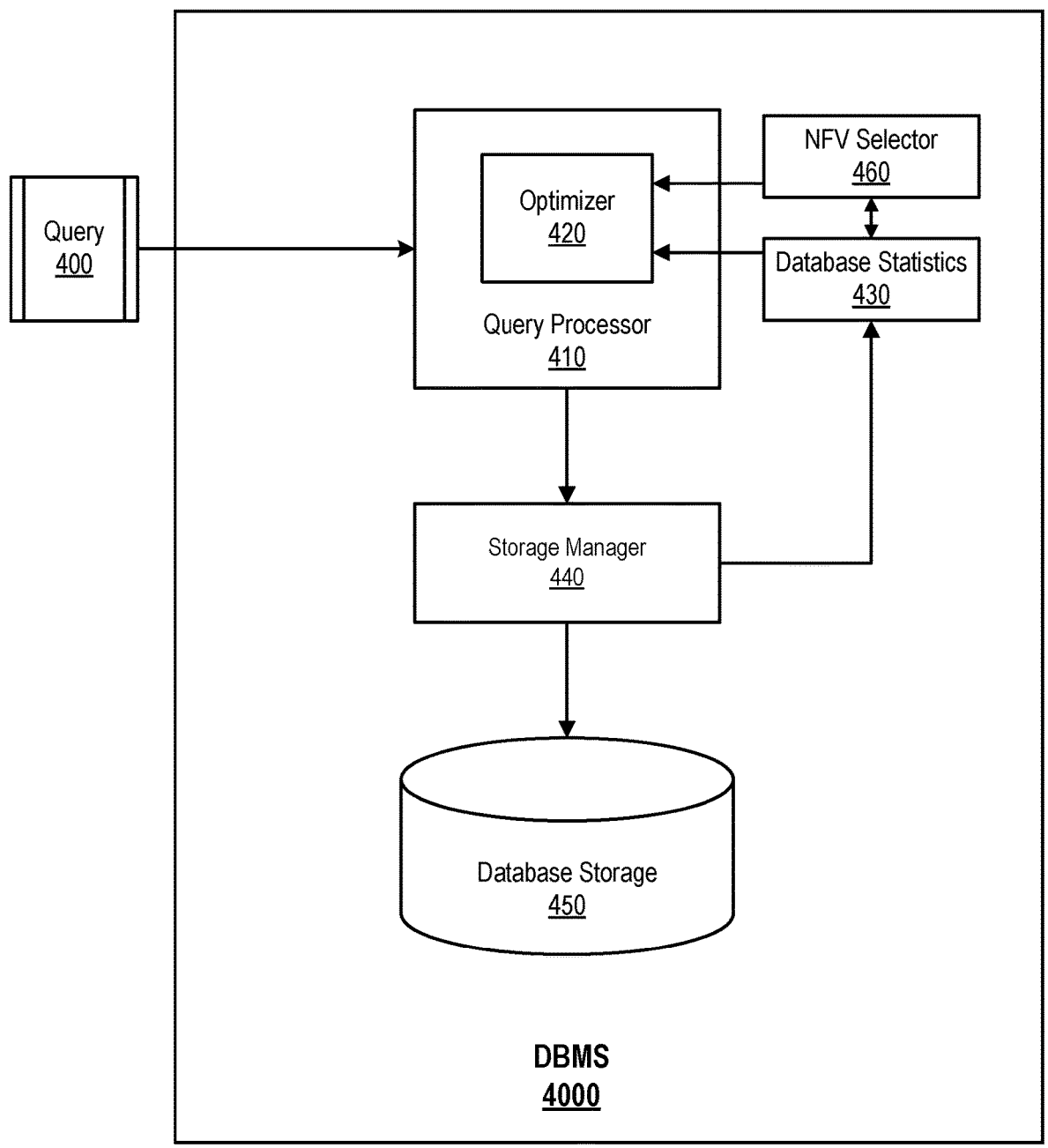
FIG. 4 shows the structure of an embodiment of the present invention comprising database-management system that incorporates improved database-maintenance and query-optimization functions.

FIG. 4 shows the structure of an embodiment of the present invention comprising database-management system that incorporates improved database-maintenance and query-optimization functions. FIG. 4 shows items 400-450 and 4000, but omits DBMS modules that are not directly involved with steps of the present invention.

Item 4000 is an improved database-management system (DBMS) that automatically selects optimized, column-specific NFV values. Like most DBMSs, DBMS 4000 comprises a database store 450 that contains tables and indexes of a database, a storage manager component 440 that controls access to the database 450, and a query processor 410 that translates incoming queries 400 and other database-access requests 400 into a detailed data-access plan that controls how the storage manager 440 responds to data-access requests comprised by an incoming query 400.

Query processor 410 contains an optimizer module 420 that selects an optimal database-access plan that is likely to be the more efficient, less costly, or less resource-intensive than other possible plans. Optimizer 420 performs this operation as a function of previously stored database statistics 430 that include a set of frequent-value statistics (FVSs) that each specify the number of times one of the most frequently occurring data values is stored in a particular database column. The number of FVSs stored for each column is specified by a global number of frequent values (NFV) statistic.

Embodiments of the present invention add an NFV-selector module 460 that improves upon known query-optimization functions by generating distinct, column-specific NFVs that each specify the smallest number of FVSs that should be maintained by the DBMS in order reduce errors when attempting to select an optimal access plan. Each NFV generated by NFV-selector module 460 is chosen as a function of a real or inferred distribution of data values in a corresponding column and, unlike the single global NFV used by existing DBMSs, is optimized for the corresponding column.

Figure 5:
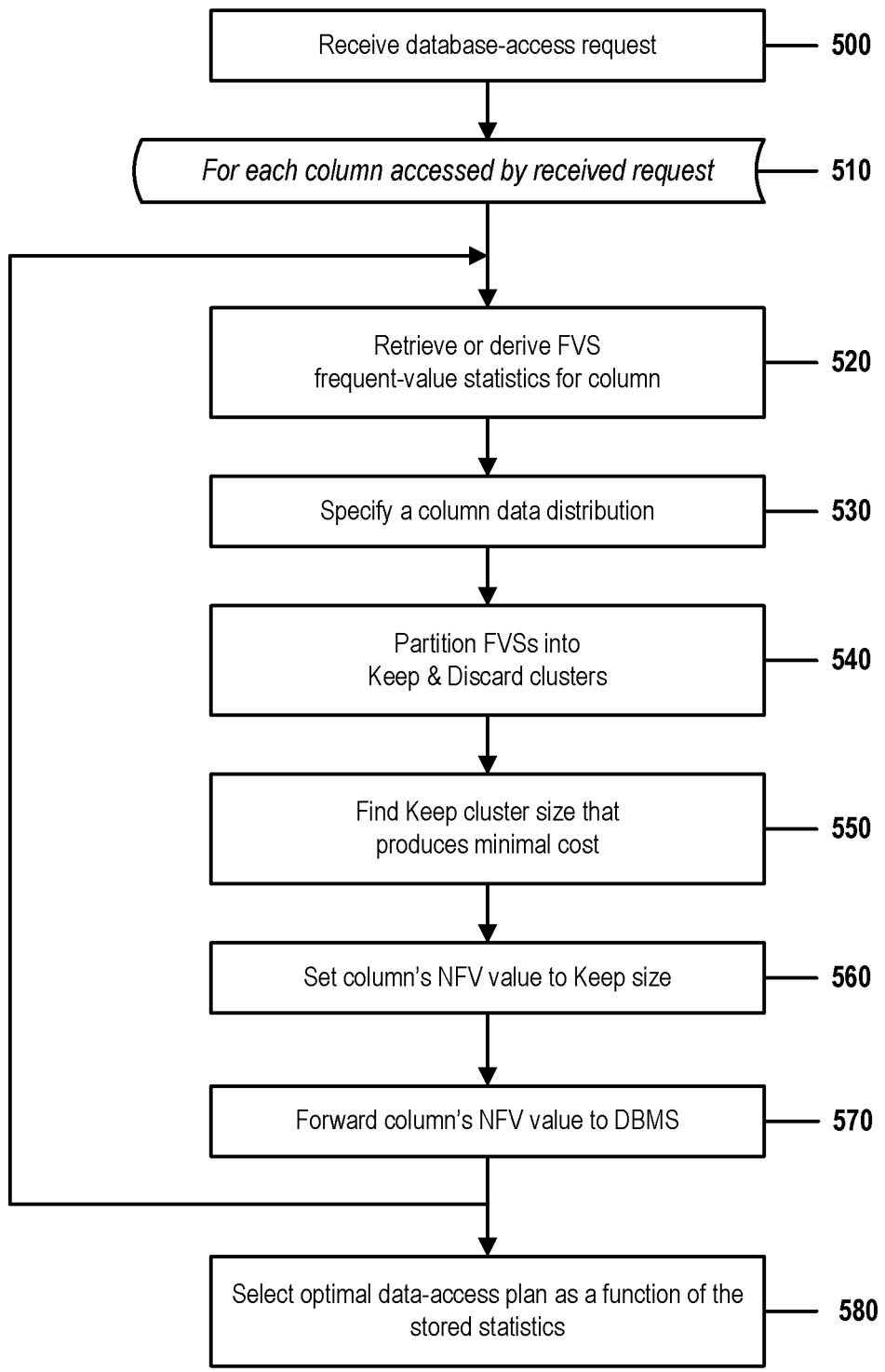
FIG. 5 is a flow chart that illustrates steps of a method for automated optimization of number-of-frequent-value statistics in accordance with embodiments of the present invention.

FIG. 5 is a flow chart that illustrates steps of a method for automated optimization of number-of-frequent-value statistics in accordance with embodiments of the present invention. FIG. 5 contains steps 500-580.

In step 500, an NFV selector module 460 of improved DBMS 4000 intercepts or otherwise receives a request to access database 450. This request may be received from another application, from a user in the form of a query, such as a query written in SQL (Structured Query Language), or from any other manual or automated operation that significantly changes the contents of one or more database columns.

Step 510 initiates an iterative procedure of steps 510-570. This procedure is repeated each time the contents of a database column are significantly altered by the received request. For example, if the request modifies columns in two distinct tables of database 450, the procedure would be performed twice, once for each column.

In step 520, selector 460 identifies a set of frequent-value statistics (FVSs) for the column being processed by the current iteration of steps 510-570. This set may not include an FVS for every distinct data value stored in the column.

This identification may be performed by retrieving the statistics from a storage repository of database statistics 430, where the stored statistics are periodically or continuously generated or updated by a component of the DBMS 4000. In some embodiments, selector 460 is the component that generates or updates the stored statistics through a scanning procedure that is not shown in FIG. 5. In other embodiments, selector 460 may in step 520 read some or all of the values stored in the column by retrieving records directly from the database table that contains the column.

In step 530, selector 460 identifies a data distribution of all data stored in the column. If selector 460 in step 520 retrieved an FVS for every distinct data value stored in the column, this identification may be performed through a straightforward enumeration procedure that counts the number of occurrences of each distinct data value. For example, selector 460 may read every value stored in the column and compile a set of FVSs that each specify how many instances of a distinct data value are stored in the column.

If selector 460 in step 520 retrieved only a subset of all possible FVSs associated with the column, the data distribution of all data stored in the column may be and extrapolated or inferred from the data distribution from of the retrieved subset.

In one example, consider a query that requires the DBMS 4000 to retrieve records that store a value of "0005" in a numeric column. Selector 460 responds in step 520 by sampling 100 of the 1000 values stored in that column. The 100 values contain 50 instances of value "0001," 30 instances of value "0005," 15 instances of value "0100," and one instance each of five other values. Selector 460 extrapolates the distribution of data values in this subset to infer that the column contains 500 instances of "0001," 300 instances of "0005," 150 instances of "0100," and a highly skewed subset of 50 other mixed values. This distribution, which includes a relatively high occurrence of value "0005," would suggest to optimizer 420 that the query would be most efficiently processed by a direct record-by-record scan of the queried table.

If, on the other hand, the 100 sampled records contain 60 distinct values that are distributed more uniformly, selector 460 would extrapolate the sampled subset to generate a distribution of all records stored in the column. Such a data distribution would be more likely to suggest that the most efficient way to service the query would be to use a database index to locate the desired records.

If desired by an implementer, embodiments may use other, known, methods of retrieving, inferring, or extrapolating the distribution of data stored in the column. In all cases, selector 460 will in step 530 generate a set of frequent-value statistics for the column, and the number of generated statistics will not have been limited by any NFV value.

In step 540, selector 460 partitions the set of FVSs into "Keep" and "Discard" clusters. In some embodiments the statistics in these clusters may be sorted in ascending or descending order of the number of occurrences of a data value stored in the column. In embodiments that employ statistical methods that do not require the values to be initially sorted, this optional sorting step may be omitted.

Regardless of whether the statistics are presorted in step 540, the clusters should be processed such that the "Keep" cluster contains FVSs associated with values stored more frequently in the column and the "Discard" cluster contains FVSs associated with values stored less frequently in the column.

Subsequent steps of the method of FIG. 5 determine an optimal size for the Keep cluster as a function of the distribution of data in the column. At the conclusion of last iteration of steps 520-570, the final number of entries in the Keep column is interpreted as the value of a column-specific NFV (number of frequent values) parameter that specifies how many FVS values should be maintained by the DBMS 4000 for this column.

In step 550, selector 460 performs a clustering analysis or minimization operation on the Keep and Discard clusters. This step may be performed as an iterative procedure that, with each iteration, increases the size of the Keep cluster until a minimum partitioning cost is found.

The present invention is flexible enough to accommodate any type of statistical or computational method desired by an implementer that is capable of determining this result.

In step 560, selector 460 sets the NFV parameter for the current column equal to the number of FVS entries in the Keep cluster. This NFV value, therefore, represents the minimum number of FVSs that the DBMS 4000 should maintain and store for the column in order to achieve the best compromise between the cost of maintaining FVS values and the accuracy of optimizer data-access plan selections based on those FVS values.

In step 570, selector 460 forwards the NFV value derived in step 560 to the DBMS 4000. The DBMS may in various embodiments employ any mechanism desired by an implementer to incorporate this NFV value into its operational procedure. For example, DBMS 4000 may store the NFV setting in a database-catalog repository where the NFV setting can be accessed by other DBMS modules, such as optimizer 420 or query processor 410.

In some embodiments, selector 460 may in this step also forward to DBMS 4000 the FVSs in the Keep cluster. The DBMS may, depending on implementation, then store the FVSs in the DBMS repository of database statistics 430 or in another data repository where the statistics can be accessed by other DBMS modules, such as optimizer 420 or query processor 410. In yet other embodiments, a standard statistic-gathering module of DBMS 4000 may instead gather or update a new set of FVSs by scanning the column, and then store a subset of the new FVSs. In this last case, the number of statistics in the subset would be identified by the forwarded NFV value.

Regardless of implementation-dependent details, at the end of the current iteration of steps 520-570, DBMS 4000 will have identified a distinct NFV value for the column and will have identified a set of FVSs, the number of which is defined by the corresponding NFV. These FVSs will be available to optimizer 420 when optimizer 420 attempts to select an optimal data-access plan for the column.

After the last iteration of steps 520-560, a distinct NFV value will have been generated and forwarded to DBMS 4000 for every column that contains data to be accessed by the incoming data-access request. In some embodiments, DBMS 4000 will have also identified or stored an optimal set of FVSs for each of these columns.

In step 580, optimizer 420 selects an optimal data-access plan capable of servicing the received query. This selection is performed as a function of the FVS values identified for each column during iterations of the procedure of steps 520-580. Optimizer 420 then forwards the optimal plan to storage manager 440 or another module of DBMS 4000 that uses the plan to access requested data items or data values from database 450.

In one example of a clustering analysis/cost-minimization procedure, as specified in steps 540-550, selector 460 samples a subset of stored data values from a database column of interest. The sample size is chosen, by means of methodologies known in the art, to be sufficient to ensure that subsequent computations are statistically meaningful. In this example, the sample contains l values and d distinct values. Selector 460 organizes this data into ordered pairs $(v_i, f_i)$, where $f_i$ instances of the $i^{th}$ distinct value $v_i$ have been retrieved from the column. These values may be extrapolated to infer a distribution of all data values stored in the column. For purposes of this example, the ordered pairs are organized such that $f_1 > f_2 > \ldots > f_d$. The total of all instances, $f_1 + f_2 + \ldots + f_d$, is equal to 1.

The goal of the following computations is to partition the ordered pairs into Keep and Discard sets, where the Keep set contains pairs that should be maintained by the DBMS 4000 for use by optimizer 420, and the Discard set contains pairs that will be discarded. For purposes of the computation, the pairs will be ordered by frequency prior to partitioning. The Keep set thus contains n pairs that specify frequencies $\{f_1, f_2, \ldots f_n\}$, and the Discard set contains l−n discarded frequencies $\{f_{n+1}, f_{n+2}, \ldots f_d\}$.

The average frequency $\bar{f}_d$ of discarded frequencies is:

$$\bar{f}_d = \frac{f_{n+1} + f_{n+2} + \ldots + f_d}{l-n}$$

Selector 460 or optimizer 420 may in some embodiments estimate the number of instances of any value $v_i$ in the entire column as:

$$f(n) = \begin{cases} c \times \left(\frac{f_i}{l}\right), & \text{if } v_i \text{ in } K \\ c \times \frac{\bar{f}_d}{l}, & \text{if } v_i \text{ in } D \end{cases}$$

where c represents the total number of rows in the table or the total number of data items stored in the column. An optimal value of n is determined by the following procedure, where the optimal value of n allows optimizer 420 to reduce errors in this estimation of f(n) to an acceptable level. A magnitude of error is deemed to be acceptable if the error falls below a predefined threshold, as provided by an implementer. This threshold may be determined by any means known in the art, such as by reviewing scientific literature, following a recommendation of a DBMS vendor, or through simple trial-and-error that correlates estimation errors with DBMS performance of cost.

This task may be solved as a clustering or minimization problem, where the ordered pairs have been partitioned into two clusters $K=\{f_1, f_2, \ldots f_n\}$ and $D=\{f_{n+1}, f_{n+2}\{n+2\}, \ldots, f_d\}$. The goal of the clustering procedure is to find a value of n, which partitions the frequencies into the two sets, that minimizes a clustering metric function or algorithm. Any clustering algorithm or metric can be chosen, and examples are described below.

In this computation, the ordered pairs are first sorted in descending order of frequency: $f_1 > f_2 > \ldots > f_d$. The cost of dividing the frequencies into two sets K and D is $$X(n) = M(K) + M(D)$$

where M(K) represents a value of the clustering metric associated with the Keep (K) cluster and M(D) represents a value of the clustering metric associated with the Discard (D) cluster. An iterative procedure will identify a value n such that X(n), the total cost of the clustering, is minimized. Before the first iteration, n may be initialized to any value desired by an implementer, but in this example, n is chosen such that the Keep set is empty and the Discard set contains all of the ordered pairs.

In each iteration, the ordered pair associated with the highest frequency in the Discard set is moved to the Keep set, and then X(n) is recalculated. If the new value of X(n) has decreased, indicating that this new partition has a lower clustering cost than the previous partition, then another iteration is performed. The procedure stops when either: i) X(n) increases, which means that the previous iteration's partition was the minimum-cost solution; or ii) Discard set is empty, which means the DBMS should maintain FVSs for all values in the column.

The present invention is flexible enough to accommodate any sort of known clustering metric desired by an implementer. For example, a K-means clustering metric M(S) of a set S is computed as a cluster sum of squares:

$$M(S)=\Sigma_{i \in S} f_i/\mu$$

where $\mu$ is the mean value of all values contained in S.

Another clustering metric is the maximum entropy metric, which clusters sample points as function of the amount of disorder in the data. When applied to a set S, an entropy metric M(S) is computed as:

$$M(S)=-\Sigma_{i \in S} p_i \log_2 f_i$$

where $p_i=f_i/1$.

Other computational approaches may be chosen by an implementer. For example, an embodiment might strive to minimize frequency estimation errors (the per cent error that occurs when selector 460 attempts to extrapolate a sampled subset of data values stored in a column to infer a data distribution of the entire column). This could be performed by an iterative procedure that attempts to find a value of n that minimizes frequency estimation errors or reduces those errors to a value that is less than a predetermined threshold error value.

Regardless of the computational details chosen by an implementer, all embodiments include steps that, in response to receiving a data-access request that includes a request to access a particular database column:

i) split the set of that column's FVSs into Keep and Discard clusters, where FVSs in the Keep cluster specify data values stored more frequently in the column than are any data values specified by FVSs in the Discard cluster;

ii) use an implementer-selected computational procedure to evaluate various partitioning configurations and to identify, for each evaluated configuration, a cost, a degree of error, or values of other implementer-selected parameters;

iii) identify an optimal partitioning configuration that generates a minimum or optimal value of the parameters;

iv) set an NFV value equal to the number of FVSs contained in the Keep cluster under the optimal partitioning configuration; and v) direct DBMS query optimizer 420 to consider the number of FVSs specified by the NFV when selecting a data-access plan.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A subsystem of a database-management system (DBMS), comprising a processor, a memory coupled to the processor, and a computer-readable hardware storage device coupled to the processor, the storage device containing program code configured to be run by the processor via the memory to implement a method for automated optimization of number-of-frequent-value statistics, the method comprising:

the subsystem receiving a request to access data stored in a database column;

the subsystem identifying a set of frequent-value statistics (FVSs), where each statistic of the set of FVSs specifies a number of times that a distinct data value is stored in the column;

the subsystem determining an optimal number of FVSs; and the subsystem directing an optimizer component of the DBMS to consider the optimal number of FVSs when selecting a most efficient data-access plan to be performed, in response to the request, by a storage-management component of the DBMS.

2. The subsystem of claim 1, where the directing further comprises:

the subsystem communicating an optimal subset of the set of FVSs to the DBMS, such that the FVSs are made accessible to the optimizer component, where a number of FVSs contained in the subset is equal to the optimal number of FVSs, and where the subset specifies only the column's most-frequently stored data values, each of which is stored in the column more frequently than any data value specified by an identified FVS not contained in the subset.

3. The subsystem of claim 1, where the directing further comprises:

the subsystem directing the DBMS to maintain and store only the optimal number of FVSs for the column, where the maintained and stored FVSs specify data values stored most frequently in the column.

4. The subsystem of claim 1, where the identifying further comprises:

the subsystem retrieving set of frequent-value statistics (FVSs) from a storage location, where the retrieved FVSs are continually updated and stored by the DBMS.

5. The subsystem of claim 1, where the identifying further comprises:

the subsystem retrieving a subset of all data values stored in the column;

the subsystem counting a number of instances of each distinct data value contained in the retrieved subset of the data; and the subsystem inferring, from the counted numbers, a distribution of data values stored in the column.

6. The subsystem of claim 5, where a frequency estimation error of the first column is an uncertainty in an accuracy of the inferred distribution of data; and where the optimal number of FVSs is a minimum number of FVSs required in order to reduce the frequency estimation error to a value that is less than a predetermined threshold value.

7. The subsystem of claim 1, where the determining further comprises:
the subsystem using a statistical method to identify the optimal number,
where the statistical method comprises a clustering-analysis procedure selected from the group consisting of K-means clustering and K-quantiles clustering; and
where the clustering-analysis procedure comprises a clustering metric selected from the group consisting of: a maximum-entropy metric and a Euclidean distance metrics.

8. The subsystem of claim 1, where the determining further comprises:
the subsystem using a statistical method to identify the optimal number, where the statistical method further comprises:
the subsystem partitioning the set of FVSs into a keep cluster and a discard cluster;
the subsystem performing an iterative minimization procedure that identifies an optimal size of the keep cluster that produces a lowest cost; and
the subsystem setting the optimal number of FVSs to the optimal size of the keep cluster.

9. A method for automated optimization of number-of-frequent-value statistics, the method comprising:
a subsystem of a database-management system (DBMS) receiving a request to access data stored in a database column;
the subsystem identifying a set of frequent-value statistics (FVSs), where each statistic of the set of FVSs specifies a number of times that a distinct data value is stored in the column;
the subsystem determining an optimal number of FVSs;
the subsystem configuring the DBMS to maintain and store only the optimal number of FVSs for the column, where the maintained and stored FVSs specify data values stored most frequently in the column; and
the subsystem directing an optimizer component of the DBMS to consider the optimal number of FVSs when selecting a most efficient data-access plan to be performed, in response to the request, by a storage-management component of the DBMS.

10. The method of claim 9, where the directing further comprises:
the subsystem communicating an optimal subset of the set of FVSs to the DBMS, such that the FVSs are made accessible to the optimizer component,
where a number of FVSs contained in the subset is equal to the optimal number of FVSs, and
where the subset specifies only the column's most-frequently stored data values, each of which is stored in the column more frequently than any data value specified by an identified FVS not contained in the subset.

11. The method of claim 9, where the identifying further comprises:
the subsystem retrieving a subset of all data values stored in the column;
the subsystem counting a number of instances of each distinct data value contained in the retrieved subset of the data; and
the subsystem inferring, from the counted numbers, a distribution of data values stored in the column.

12. The method of claim 11,
where a frequency estimation error of the first column is an uncertainty in an accuracy of the inferred distribution of data; and
where the optimal number of FVSs is a minimum number of FVSs required in order to reduce the frequency estimation error to a value that is less than a predetermined threshold value.

13. The method of claim 9, where the determining further comprises:
the subsystem using a statistical method to identify the optimal number,
where the statistical method comprises a clustering-analysis procedure selected from the group consisting of K-means clustering and K-quantiles clustering; and
where the clustering-analysis procedure comprises a clustering metric selected from the group consisting of: a maximum-entropy metric and a Euclidean distance metrics.

14. The method of claim 9, where the determining further comprises:
the subsystem using a statistical method to identify the optimal number,
where the statistical method further comprises:
the subsystem partitioning the set of FVSs into a keep cluster and a discard cluster;
the subsystem performing an iterative minimization procedure that identifies an optimal size of the keep cluster that produces a lowest cost; and
the subsystem setting the optimal number of FVSs to the optimal size of the keep cluster.

15. The method of claim 9, further comprising providing at least one support service for at least one of creating, integrating, hosting, maintaining, and deploying computer-readable program code in the computer system, wherein the computer-readable program code in combination with the computer system is configured to implement the receiving, the identifying, the determining, the configuring, and the directing.

16. A computer program product, comprising a computer-readable hardware storage device having a computer-readable program code stored therein, the program code configured to be executed by optimizer component, of a subsystem of a database-management system (DBMS), comprising a processor, a memory coupled to the processor, and a computer-readable hardware storage device coupled to the processor, the storage device containing program code configured to be run by the processor via the memory to implement a method for automated optimization of number-of-frequent-value statistics, the method comprising:
the subsystem receiving a request to access data stored in a database column;
the subsystem identifying a set of frequent-value statistics (FVSs), where each statistic of the set of FVSs specifies a number of times that a distinct data value is stored in the column;
the subsystem determining an optimal number of FVSs;
the subsystem configuring the DBMS to maintain and store only the optimal number of FVSs for the column, where the maintained and stored FVSs specify data values stored most frequently in the column; and
the subsystem directing an optimizer component of the DBMS to consider the optimal number of FVSs when selecting a most efficient data-access plan to be performed, in response to the request, by a storage-management component of the DBMS.

17. The computer program product of claim 16, where the directing further comprises:
   the subsystem communicating an optimal subset of the set of FVSs to the DBMS, such that the FVSs are made accessible to the optimizer component,
      where a number of FVSs contained in the subset is equal to the optimal number of FVSs, and
      where the subset specifies only the column's most-frequently stored data values, each of which is stored in the column more frequently than any data value specified by an identified FVS not contained in the subset.

18. The computer program product of claim 16, where the identifying further comprises:
   the subsystem retrieving a subset of all data values stored in the column;
   the subsystem counting a number of instances of each distinct data value contained in the retrieved subset of the data; and
   the subsystem inferring, from the counted numbers, a distribution of data values stored in the column.

19. The computer program product of claim 16, where the determining further comprises:
   the subsystem using a statistical method to identify the optimal number,
      where the statistical method comprises a clustering-analysis procedure selected from the group consisting of K-means clustering and K-quantiles clustering; and
      where the clustering-analysis procedure comprises a clustering metric selected from the group consisting of: a maximum-entropy metric and a Euclidean distance metrics.

20. The computer program product of claim 16, where the determining further comprises:
   the subsystem using a statistical method to identify the optimal number,
      where the statistical method further comprises:
         the subsystem partitioning the set of FVSs into a keep cluster and a discard cluster;
         the subsystem performing an iterative minimization procedure that identifies an optimal size of the keep cluster that produces a lowest cost; and
         the subsystem setting the optimal number of FVSs to the optimal size of the keep cluster.

* * * * *